United States Patent
Pereira et al.

(10) Patent No.: US 10,155,192 B2
(45) Date of Patent: Dec. 18, 2018

(54) PROCESS DESIGNS FOR INCREASED SELECTIVITY AND CAPACITY FOR HYDROGEN SULFIDE CAPTURE FROM ACID GASES

(71) Applicant: ExxonMobil Research and Engineering Company, Annandale, NJ (US)

(72) Inventors: Carla S. Pereira, Somerville, NJ (US); Michael Siskin, Westfield, NJ (US); Himanshu Gupta, Lebanon, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 164 days.

(21) Appl. No.: 15/169,835

(22) Filed: Jun. 1, 2016

(65) Prior Publication Data

US 2017/0348630 A1     Dec. 7, 2017

(51) Int. Cl.
    *B01D 53/52*      (2006.01)
    *B01D 53/14*      (2006.01)
    *B01D 53/78*      (2006.01)
    *B01D 53/96*      (2006.01)
    (Continued)

(52) U.S. Cl.
     CPC ..... *B01D 53/1406* (2013.01); *B01D 53/1425* (2013.01); *B01D 53/1468* (2013.01); *B01D 53/1493* (2013.01); *B01D 53/18* (2013.01); *C10L 3/103* (2013.01); *B01D 2252/204* (2013.01); *B01D 2252/20405* (2013.01); *B01D 2252/20478* (2013.01); *B01D 2252/20484* (2013.01); *B01D 2257/304* (2013.01);
    (Continued)

(58) Field of Classification Search
None
See application file for complete search history.

(56) References Cited

U.S. PATENT DOCUMENTS

2011/0008229 A1    1/2011   Iyengar et al.
2014/0339768 A1   11/2014   Kitamura et al.
    (Continued)

FOREIGN PATENT DOCUMENTS

CA      729090 A     3/1966
FR      2938454 A1    5/2010

OTHER PUBLICATIONS

Invitation to Pay Additional Fees, Search Report, and Written Opinion PCT/US2017/028227 dated Aug. 25, 2017.

*Primary Examiner* — Daniel Berns
(74) *Attorney, Agent, or Firm* — Andrew T. Ward; Joseph E. Wrkich; Priya G. Prasad

(57) ABSTRACT

A system and process for selectively separating $H_2S$ from a gas mixture which also comprises $CO_2$ is disclosed. A water recycle stream is fed to the absorber in order to create a higher concentration absorbent above the recycle feed and having a greater $H_2S$ selectivity at lower acid gas loadings, and a more dilute absorbent below the recycle feed and having a greater $H_2S$ selectivity at higher acid gas loadings. Also disclosed is a system and process for selectively separating $H_2S$ by utilizing two different absorbents, one absorbent for the upper section of the absorber, tailored to have a greater $H_2S$ selectivity at lower acid gas loadings, and a second absorbent for the lower section of the absorber, tailored to have a greater $H_2S$ selectivity at higher acid gas loadings.

6 Claims, 7 Drawing Sheets

(51) Int. Cl.
*B01D 53/18* (2006.01)
*C10L 3/10* (2006.01)
(52) U.S. Cl.
CPC ..... *C10L 2290/12* (2013.01); *C10L 2290/542* (2013.01); *C10L 2290/545* (2013.01)

(56) References Cited

U.S. PATENT DOCUMENTS

2015/0027055 A1    1/2015   Kortunov et al.
2017/0182455 A1    6/2017   Pereira et al.

PROCESS DESIGNS FOR INCREASED SELECTIVITY AND CAPACITY FOR HYDROGEN SULFIDE CAPTURE FROM ACID GASES

BACKGROUND

The present invention relates to a novel process design for removing acid gases from natural gas and other gas streams. In particular, it relates to a process for increasing the selectivity and capacity for hydrogen sulfide removal from a natural gas stream using amine absorbents.

A number of different technologies are available for removing acid gases such as carbon dioxide, hydrogen sulfide, carbonyl sulfide. These processes include, for example, chemical absorption (amines, including alkanolamines), physical absorption (solubility, e.g., organic solvent, ionic liquid), cryogenic distillation (Ryan Holmes process), and membrane system separation. Of these, amine separation is a highly developed technology with a number of competing processes in hand using various amine sorbents such as monoethanolamine (MEA), diethanolamine (DEA), triethanolamine (TEA), N-methyldiethanolamine (MDEA), diisopropylamine (DIPA), diglycolamine (DGA), 2-amino-2-methyl-1-propanol (AMP) and piperazine (PZ). Of these, MEA, DEA, and MDEA are the ones most commonly used.

It is often necessary or desirable to treat acid gas mixtures containing both $CO_2$ and $H_2S$ so as to remove the $H_2S$ selectively from the mixture while minimizing removal of the $CO_2$. While removal of $CO_2$ may be necessary to avoid corrosion problems and provide the required heating value to the consumer, selective $H_2S$ removal may be necessary or desirable. Natural gas pipeline specifications, for example, set more stringent limits on the $H_2S$ level than on the $CO_2$ since the $H_2S$ is more toxic and corrosive than $CO_2$: common carrier natural gas pipeline specifications typically limit the $H_2S$ content to 4 ppmv with a more lenient limitation on the $CO_2$ at 2 vol %. Selective removal of the $H_2S$ may enable a more economical treatment plant to be used and selective $H_2S$ removal is often desirable to enrich the $H_2S$ level in the feed to a sulfur recovery unit.

FIG. 1 shows a schematic representation of a typical absorption-regeneration unit used for the removal of $H_2S$ and $CO_2$. The acid gas scrubbing process using an amine in the purification process usually involves contacting the gas mixture countercurrently with an aqueous solution of the amine in an absorber tower. The liquid amine stream is then regenerated by desorption of the absorbed gases in a separate tower with the regenerated amine and the desorbed gases leaving the tower as separate streams. The various gas purification processes which are available are described, for example, in Gas Purification, Fifth Ed., Kohl and Neilsen, Gulf Publishing Company, 1997, ISBN-13: 978-0-88415-220-0.

U.S. application Ser. No. 14/980,634, which is incorporated by reference in its entirety herein, describes an absorbent system that can selectively absorb $H_2S$ from gas mixtures that also contain $CO_2$ by controlling the pH of the absorbent system. The pH of the amine/alkanolamine absorbent system is reduced/controlled in one aspect by diluting the concentration of the amine/alkanolamine absorbent. The lower pH favors bicarbonate formation, increasing acid gas ($H_2S$ and $CO_2$) loading, and increasing the selectivity of $H_2S$ over $CO_2$ over a broad loading range. Particular amines that are found useful in the present invention are amines and alkanolamines, preferably sterically hindered amines and alkanolamines, and most preferably capped, sterically hindered amines such as methoxyethoxyethoxyethanol-t-butylamine (M3ETB).

FIG. 1 shows a schematic representation of a typical absorption-regeneration unit used for the selective removal of $H_2S$ and $CO_2$. The acid gas scrubbing process using an amine in the purification process usually involves contacting the sour gas mixture 10 countercurrently with an aqueous solution of the lean amine 12 in absorber tower 100, producing sweet gas mixture 11. The rich amine stream 14 is then regenerated by desorption of the absorbed gases in regenerator tower 110 with the regenerated lean amine 12 and the desorbed gases 16 leaving regenerator tower 110 as separate streams. This and other gas purification processes that are available are described, for example, in Gas Purification, Fifth Ed., Kohl and Neilsen, Gulf Publishing Company, 1997, ISBN-13: 978-0-88415-220-0.

What is still needed is a process design for efficiently and effectively taking advantage of the teachings of U.S. application Ser. No. 14/980,634, specifically the improved selectivity of $H_2S$ over $CO_2$ by reducing/controlling the pH of the absorbent system.

SUMMARY OF THE INVENTION

A system and process for selectively separating $H_2S$ from a gas mixture which also comprises $CO_2$ is disclosed. A water recycle stream is taken from the amine regenerator, cooled, and fed to the absorber, creating a higher concentration amine absorbent above the recycle feed and a more dilute amine absorbent below the recycle feed. This results in improved $H_2S$ capture, as the higher concentration amine has a greater $H_2S$ selectivity at the lower acid gas loadings found in the upper section of the absorber, and the more dilute amine has a greater $H_2S$ selectivity at the higher acid gas loadings found in the lower section of the absorber.

Also disclosed is a system and process for selectively separating $H_2S$ by utilizing two different amine absorbents. In one aspect, the two amine absorbents are the same composition, but with different concentrations. The amine absorbent fed to the upper section of the absorber has a higher amine concentration and thus a greater $H_2S$ selectivity at lower acid gas loadings. The amine absorbent fed to the lower section of the absorber has a lower amine concentration and thus a greater $H_2S$ selectivity at higher acid gas loadings. In a second aspect, the two amine absorbents have different compositions, with the amine selected for the upper section of the absorber tailored to have a greater $H_2S$ selectivity at lower acid gas loadings, while the amine selected for the lower section of the absorber is tailored to have a greater $H_2S$ selectivity at higher acid gas loadings. In either aspect, the two amine absorbents are regenerated separately, preferably in a divided wall stripper regenerator.

DETAILED DESCRIPTION

Figure 1:
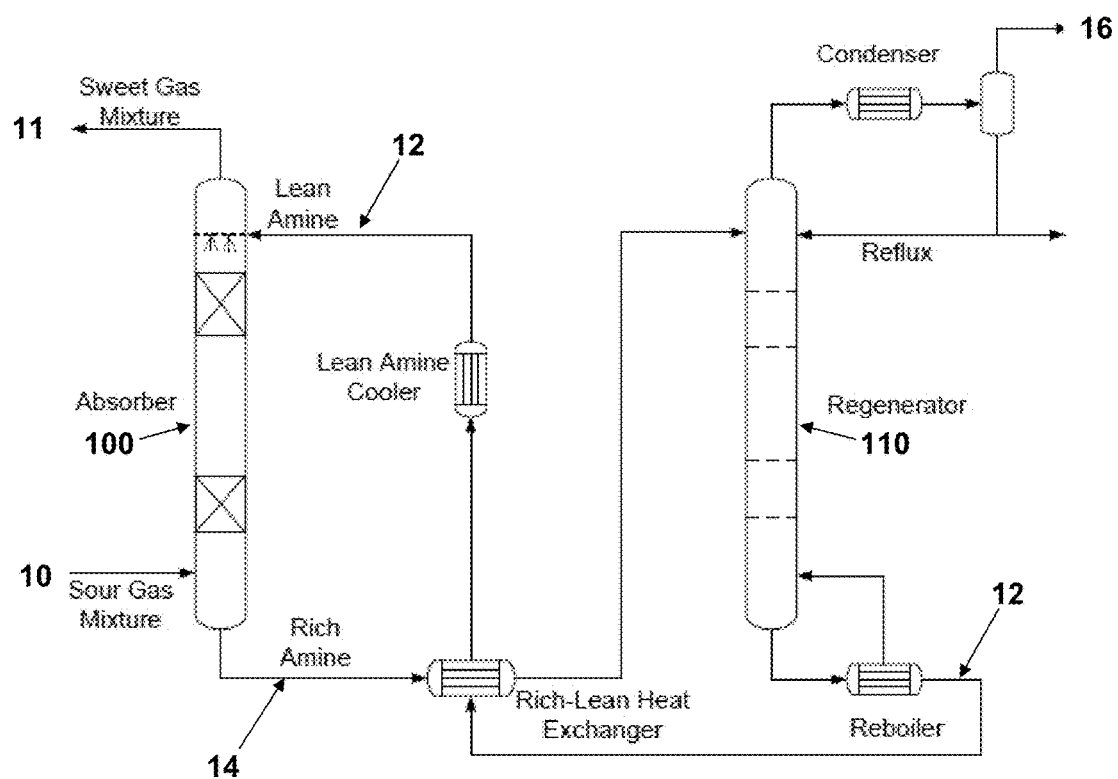
FIG. 1 is a prior art schematic representation of a typical absorption-regeneration unit used for the selective removal of $H_2S$.

A key finding in U.S. application Ser. No. 14/980,634, which is incorporated by reference in its entirety herein, is that reducing the amine concentration generally favors selectivity of $H_2S$ removal over a wide range of acid gas loadings. FIG. 1 of that patent, reproduced as FIG. 2 here, demonstrates this principle. Specifically, FIG. 2 demonstrates that the 30 wt % M3ETB solution yields an overall higher selectivity of $H_2S$ over $CO_2$ for the commercially desirable acid gas loading range of 0.2 to 0.6, when compared to the 49.5 and 35.8 wt % M3ETB solutions. However, FIG. 2 also demonstrates that the 35.8 wt % M3ETB solution yields higher selectivity of $H_2S$ over $CO_2$ for gas loadings below 0.2.

Figure 3:
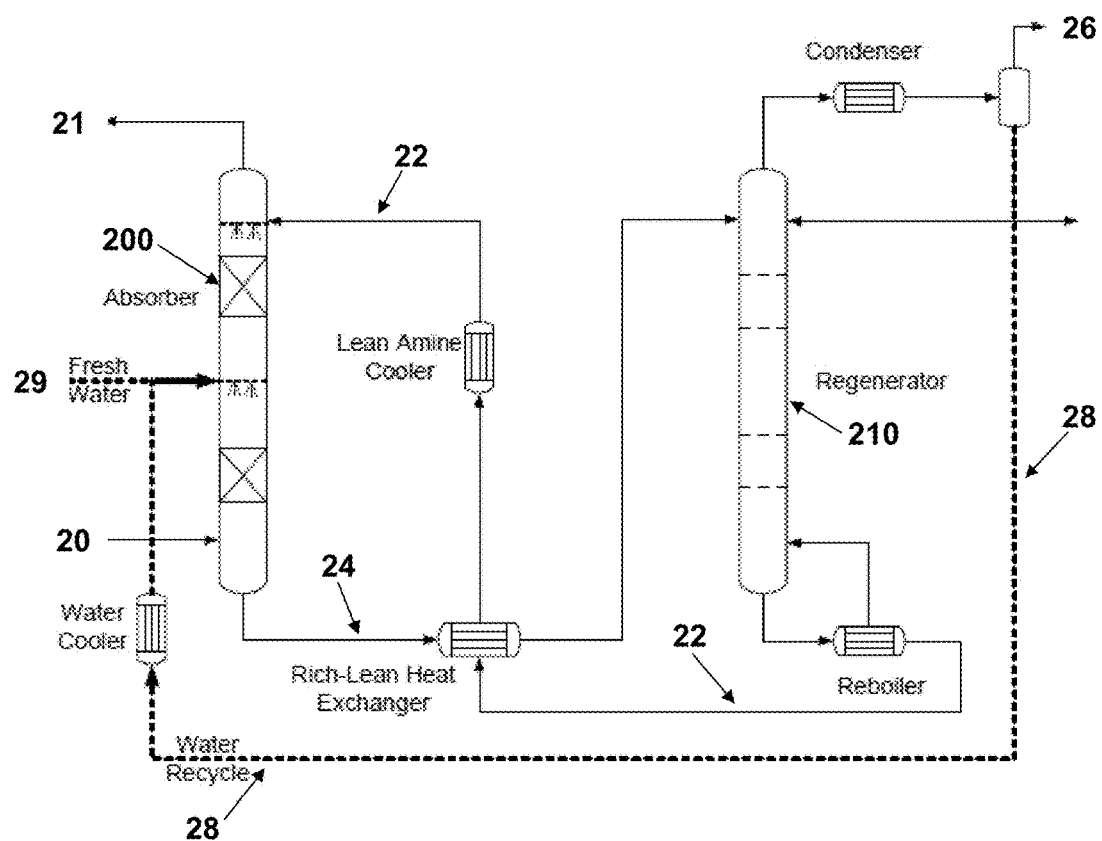
FIG. 3 is a schematic representation of an absorption-regeneration unit for the selective removal of $H_2S$ in accordance with a first embodiment of the present invention.

To implement the teachings of U.S. application Ser. No. 14/980,634, a first preferred embodiment of the present invention is illustrated in FIG. 3, a schematic representation of a novel absorption-regeneration unit process design. As with FIG. 1, FIG. 3 depicts contacting the sour gas mixture 20 countercurrently with an aqueous solution of the lean amine 22 in absorber tower 200, producing sweet gas mixture 21. The rich amine stream 24 is then regenerated by desorption of the absorbed gases in regenerator tower 210 with the regenerated lean amine 22, the desorbed gases 26, and an additional water recycle stream 28 leaving regenerator tower 210 as separate streams. Water recycle stream 28 consists essentially of condensed water, and may include up to 100% of the condensed water from the top of regenerator tower 210. Water recycle stream 28, after being cooled, is fed to absorber tower 200 between the lean amine 22 and the sour gas 20 feed points, at an optimal feed location. Fresh water 29 may also be added to water recycle stream 28 prior to feeding to absorber tower 200, although a person of ordinary skill in the art will appreciate that water balance must be managed depending on the amount of water lost and added to the system. The temperature of water recycle stream 28, which may be controlled in the range of about 5° C. up to the absorber operating temperature, controls the exothermicity of the acid gas-amine reaction, and improves the overall performance of the absorber as discussed below with respect to FIGS. 4 and 5.

Figure 2:
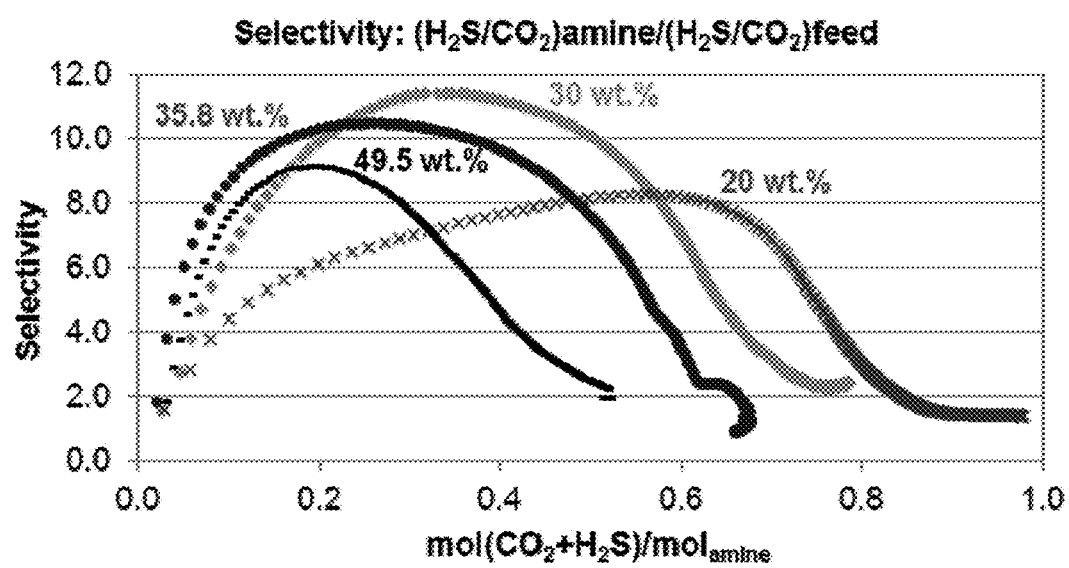
FIG. 2 is a plot of the selectivity of $H_2S$ over $CO_2$ as a function of acid gas loading with different concentrations of M3ETB aqueous solutions.

Water recycle stream 28, with or without fresh water 29 addition, creates an amine concentration gradient in absorber tower 200 that improves the overall $H_2S$ removal selectivity by taking advantage of FIG. 2. First, the top section of absorber tower 200, above the water recycle 28 feed point, has a more concentrated amine solution and therefore gives higher selectivity for lower acid gas loadings (see 35.8 wt % M3ETB in FIG. 2). Meanwhile, the bottom section of absorber tower 200, below the water recycle 28 feed point, has a more diluted amine solution because of the additional water added, and therefore gives higher selectivity for higher acid gas loadings (see 30 wt % M3ETB in FIG. 2).

In addition to improved $H_2S$ selectivity, the novel process design of FIG. 3 has further benefits due to the reduced bulge temperature in the absorber. Specifically, the bulge temperature of the absorber (due to the exothermic character of the acid-base reactions) is reduced, thereby allowing the absorber to operate at higher acid gas loadings and maximize $H_2S$ removal. The reduced bulge temperature also has a significant positive impact on selectivity and loading as demonstrated by FIGS. 4 and 5a/b, discussed below. The reduced bulge temperature also lowers corrosion rates, which is a synergistic effect of operating with lower amine concentrations.

Figure 4:
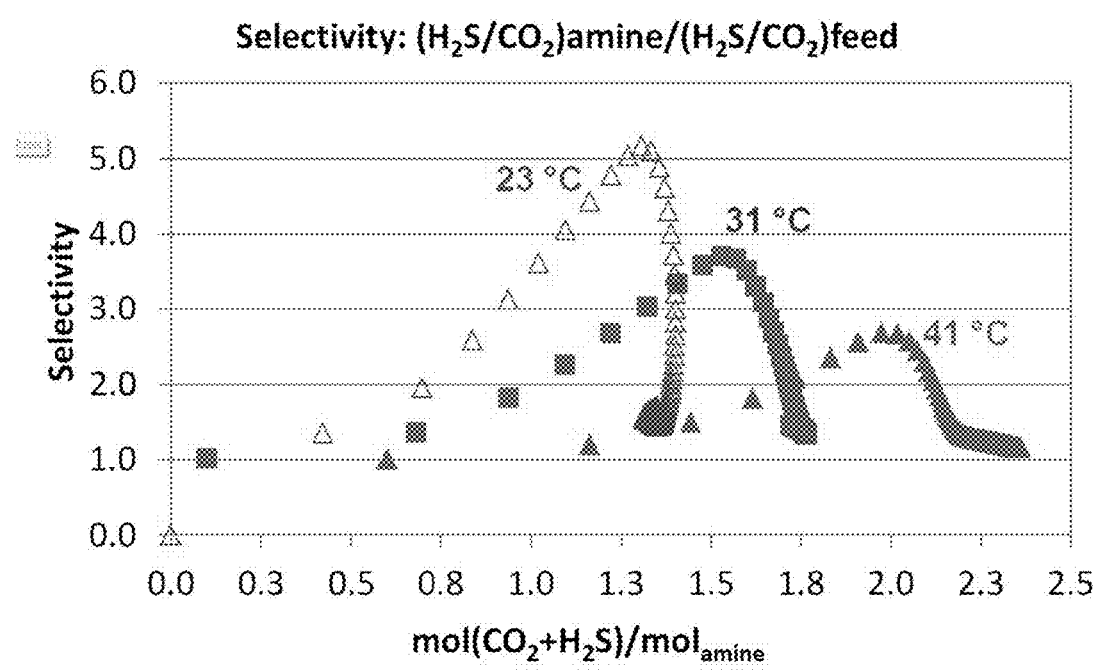
FIG. 4 is a plot of the selectivity of $H_2S$ over $CO_2$ as a function of total acid gas loading at different absorber temperatures.
Figure 5A:
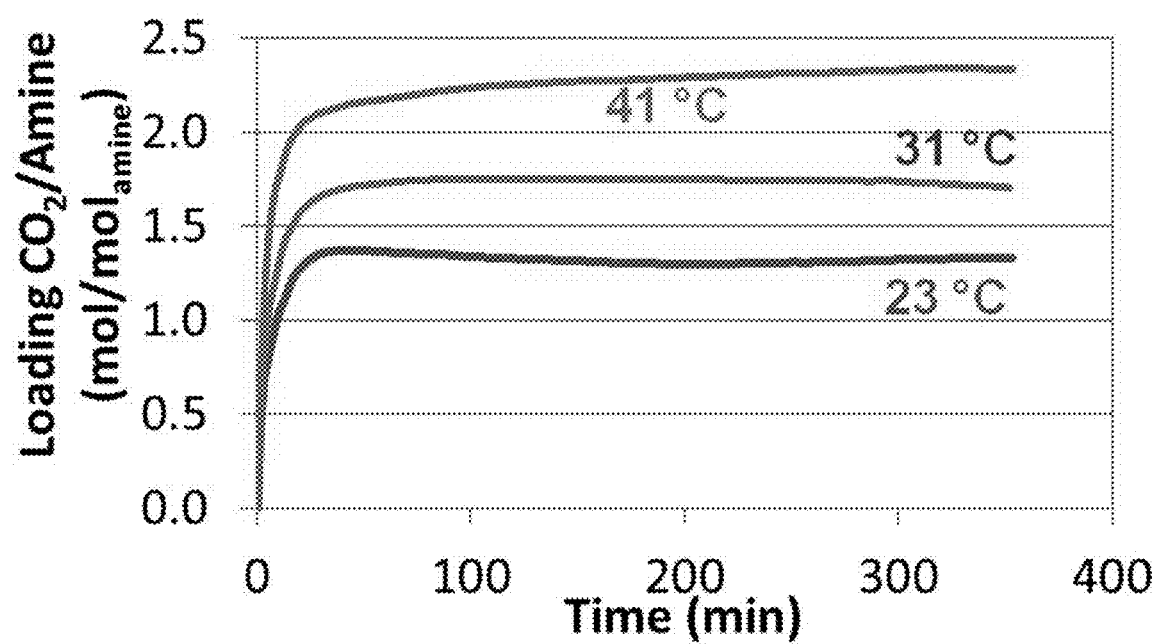
FIG. 5a is a plot of the $CO_2$ uptake as a function of treatment time by 36 wt % EETB aqueous solutions at different absorber temperatures.

The data for FIGS. 4 and 5a/b was obtained from a process absorption unit (PAU) operating in a semi-batch system, comprising a water saturator, a stirred autoclave to which gas can be fed in up-flow mode, and a condenser. The autoclave is equipped with a pressure gauge and a type J thermocouple. A safety rupture disc is attached to the autoclave head. A high wattage ceramic fiber heater is used to supply heat to the autoclave. The gas flows are regulated by Brooks mass flow controllers and the temperature of the condenser is maintained by a chiller. The maximum PAU working pressure and temperature are 1000 psi (69 bar) and 350° C., respectively. A custom LabVIEW program is used to control the PAU operation and to acquire experimental data (temperature, pressure, stirrer speed, pH, gas flow rate, and off-gas concentration).

The data was collected by flowing the test acid gas mixture through the autoclave in which the amine solution was previously loaded. The acid gas mixture was fed to the bottom of the reactor by-passing the water saturator. The gases leaving the autoclave were transferred through the condenser (maintained at 10° C.) in order to remove any entrained liquids. A slip-stream of the off-gas leaving the condenser was piped to a micron-GC (Inficon) for analysis while the main gas flow passed through a scrubber. After reaching breakthrough, nitrogen was used to purge the system. The off-gas composition was measured using a custom-built micro GC. The micro GC is configured as a refinery Gas Analyzer and includes four columns (Mole Sieve, PLOT U, OV-1, PLOT Q) and four TCD detectors. A slip stream of the off-gas was injected into the micro GC approximately every 2 minutes. A small internal vacuum pump was used to transfer the sample into the micro GC. The nominal pump rate was ~20 mL/min in order to achieve 10× the volume of line flushes between the sample tee and the micro GC. The actual gas injected into the micro GC was ~1 μL. The PLOT U column was used to separate and identify $H_2S$ and $CO_2$, and the micro TCD was used to quantify $H_2S$ and $CO_2$.

Test conditions for FIGS. 4 and 5a/b were as follows: gas feed composition: 31.6 mol % $CO_2$, 0.25 mol % $H_2S$, balance $N_2$; gas flow rate: 1004 sccm; temperature: varied, pressure: 56 bar; volume: 15 mL; stirring rate: 200 rpm; amine solution: 36 wt % EETB.

FIG. 4 is a plot of the selectivity of $H_2S$ over $CO_2$ as a function of total acid gas loading at different absorber temperatures. The data demonstrates that the lower bulge temperatures provide an increased $H_2S$ selectivity, with the increased $H_2S$ selectivity occurring at lower acid gas loadings. This is consistent with the novel process design of FIG. 3, in which the water recycle 28 incrementally lowers the bulge temperature, which necessarily occurs at the bottom of absorber 200 (i.e., below the water recycle feed point) where the acid gas loading is the lowest. As such, the reduced bulge temperature and the reduced amine concentration act together to improve $H_2S$ selectivity in the lower portion of absorber 200.

Figure 5B:
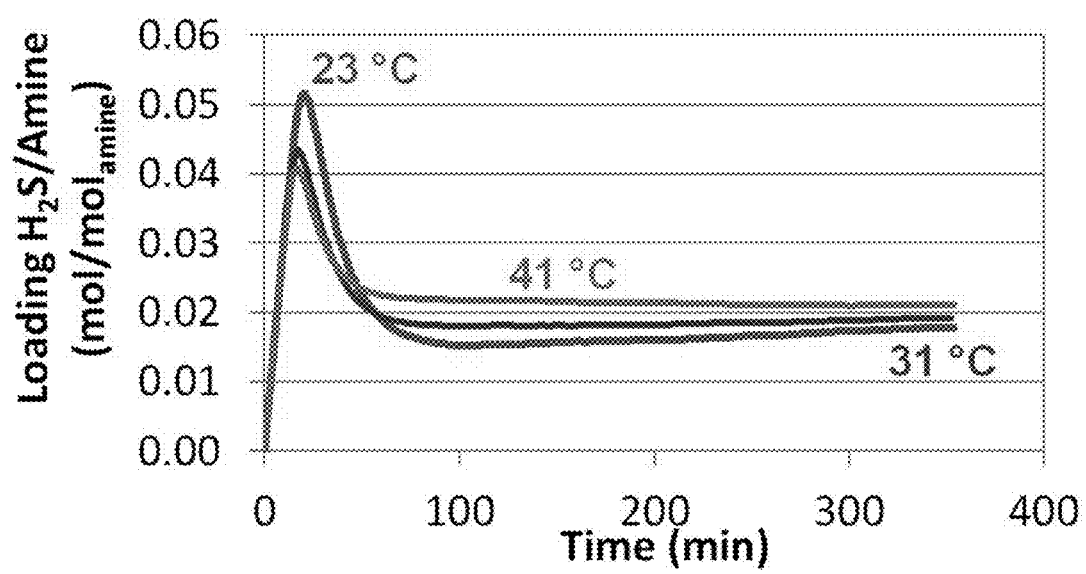
FIG. 5b is a plot of the $H_2S$ uptake as a function of treatment time by 36 wt % EETB aqueous solutions at different absorber temperatures.

FIGS. 5a and 5b demonstrate the effect of $CO_2$ and $H_2S$ uptake, respectively, as a function of treatment time at different absorber temperatures. FIG. 5a demonstrates that lower temperatures specifically lowers the $CO_2$ uptake over longer treatment times (i.e., in the top section of the absorber). FIG. 5b demonstrates that a lower temperature increases $H_2S$ uptake, especially at shorter treatment times (i.e. in the bottom section of the absorber). Both of these conclusions favor maximum $H_2S$ removal in absorber 200 of FIG. 3.

Figure 6:
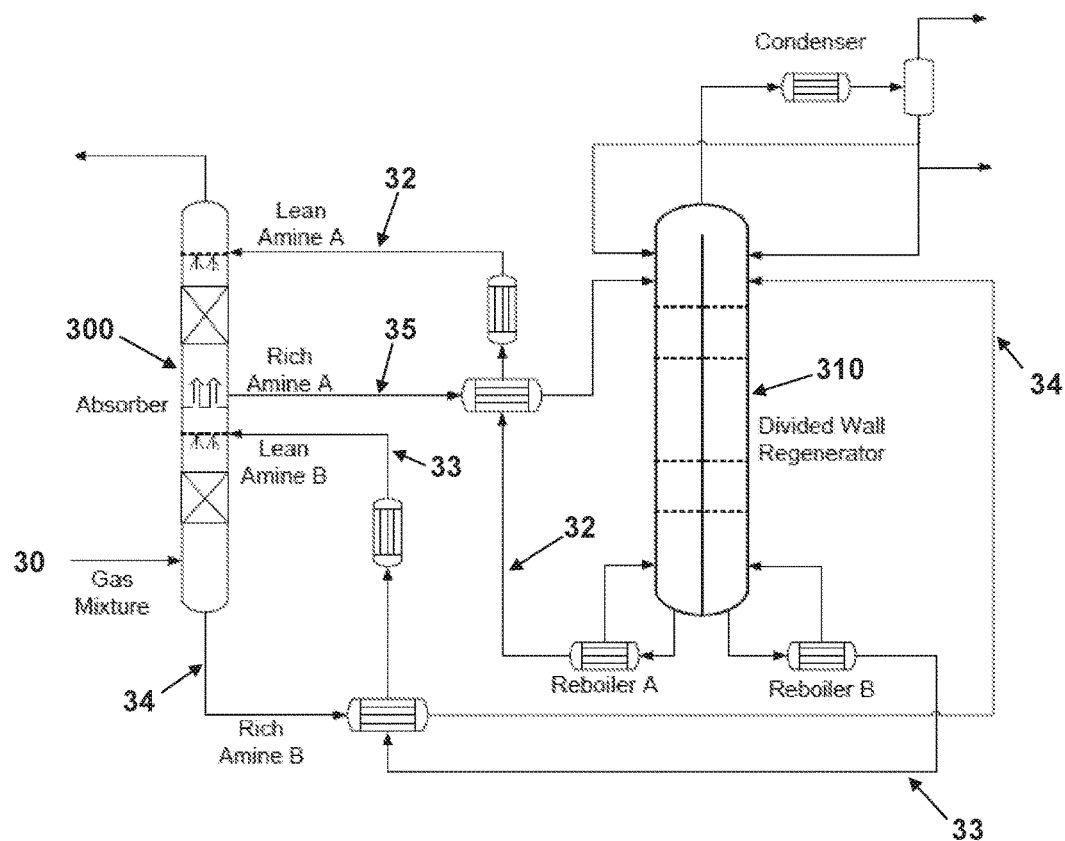
FIG. 6 is a schematic representation of an absorption-regeneration unit for the selective removal of $H_2S$ in accordance with a second embodiment of the present invention.

A second embodiment of the present invention is illustrated in FIG. 6, a schematic representation of a novel absorption-regeneration unit process design, utilizing an absorber 300 and a double wall regenerator 310. In this embodiment, two different amines or the same amine with two different concentrations are deployed in the upper and lower sections of a single amine scrubber. In this embodiment, the terminology Amine A and Amine B encompass a difference in amine type or a difference in amine concentration.

FIG. 6 depicts the gas-liquid counter-current contacting column (absorber 300) is divided into an upper section and a lower section. Sour gas 30 is introduced into the lower section of absorber 300 and up-flows through the entire column. Amine A [32] is introduced near the top of the upper section of absorber 300. Amine A down-flows through the column to the bottom of the upper section, contacting the pre-treated sour gas that arises from the lower section. The rich Amine A stream [35] is collected from the bottom of the upper section of absorber 300, and is regenerated in double wall stripper regenerator 310 in accordance with the scheme shown in FIG. 6. Amine B [33] is introduced near the top of the lower section of absorber 300. Amine B down-flows through the column to the bottom of the lower section, contacting the more concentrated sour gas. The Rich Amine B stream [34] is collected at the bottom of absorber 300 and is regenerated in double wall stripper regenerator 310 in accordance with the scheme shown in FIG. 6.

In this embodiment of the present invention, if Amine A and Amine B are different concentrations of the same amine, Amine A has a higher concentration than Amine B. As with the water recycle embodiment of the present invention, the more concentrated Amine A solution gives higher $H_2S$ selectivity for lower acid gas loadings (see 35.8 wt % M3ETB in FIG. 2), as is found in the upper section of absorber 300. The more diluted Amine B solution gives a higher $H_2S$ selectivity for higher acid gas loadings (see 30 wt % M3ETB in FIG. 2), as is found in the lower section of absorber 300.

Similarly, if Amine A and Amine B are two different amines with different performance characteristics, Amine A and Amine B can be selected and optimized based on relative $H_2S$ selectivities for lower and higher acid gas loadings, respectively, to maximize the removal of $H_2S$. It is also envisioned that one or both of Amine A and Amine B are selected from aqueous amines, as described above, or non-aqueous amine systems, such as those described in U.S. patent application Ser. No. 14/339,768, which is incorporated by reference in its entirety herein.

Additional Embodiments

According to certain teachings of the present invention, a process is provided for selectively separating $H_2S$ from a sour gas stream which also comprises $CO_2$. The process comprises the steps of providing an absorber column and an absorbent regenerator column, feeding the sour gas stream near the bottom of the absorber, feeding an absorbent comprising one or more amines near the top of the absorber, and feeding a water stream to the absorber above the sour gas stream feed point and below the absorbent feed point. The one or more amines is selected from amines, alkanolamines, sterically hindered akanolamines, or mixtures thereof. The water stream comprises at least a portion of the condensed water from the regenerator overhead condenser, which may be cooled prior to feeding to the absorber, and may also comprise fresh water.

Another embodiment of the present invention is a process for selectively separating $H_2S$ from a sour gas stream which also comprises $CO_2$. The process comprises the steps of providing an absorber column having an upper section and a lower section, feeding the sour gas stream near the bottom of the absorber, feeding a first absorbent comprising one or more amines near the top of the upper section of the absorber, and feeding a second absorbent comprising one or more amines near the top of the lower section of the absorber. The first absorbent is removed as a first rich absorbent near the bottom of the upper section of the absorber. The second absorbent is removed as a second rich absorbent near the bottom of the absorber. Both the first and the second absorbent may be regenerated in a double wall regenerator. The one or more amines is selected from amines, alkanolamines, sterically hindered akanolamines, or mixtures thereof. In one aspect of this embodiment, the first absorbent and the second absorbent have the same composition, with the first absorbent having a higher amine concentration than the second absorbent. In another aspect of this embodiment, the first absorbent and the second absorbent comprise different amines, with the first absorbent having a higher $H_2S$ selectivity than the second absorbent at a low acid gas loading, and the second absorbent having a higher $H_2S$ selectivity than the first absorbent at a high acid gas loading.

Yet another embodiment of the present invention is a system for selectively absorbing $H_2S$ from a raw gas stream which also comprises $CO_2$. The system comprises an absorbing means for contacting the raw gas stream with a lean amine stream to create a rich amine stream comprising at least a portion of the $H_2S$ from the raw gas stream, and a regenerating means for stripping $H_2S$ from the rich amine stream to create the lean amine stream. A water stream is fed to the absorbing means in order to increase the amount of $H_2S$ in the rich amine stream. The water stream is derived from the regenerating means, cooled before being fed to the absorbing means, and may further comprise additional fresh water.

Still another embodiment of the present invention is a system for selectively absorbing $H_2S$ from a raw gas stream which also comprises $CO_2$. The system comprises a first absorbing means for contacting the raw gas stream with a first lean amine stream to create a treated gas stream and a first rich amine stream comprising at least a first portion of the $H_2S$ from the raw gas stream, and a second absorbing means for contacting the treated gas stream with a second lean amine stream to create a sweet gas stream and a second rich amine stream comprising at least a second portion of the $H_2S$ from the raw gas stream. A first regenerating means is provided for stripping $H_2S$ from the first rich amine stream to create the first lean amine stream. A second regenerating means is provided for stripping $H_2S$ from the second rich amine stream to create the second lean amine stream. The first and second absorbing means may be in the same tower. The first and second regenerating means may be in the same tower. In one aspect of this embodiment, the first lean amine stream and the second lean amine stream have the same composition, with the first lean amine stream having a higher amine concentration than the second lean amine stream. In another aspect of this embodiment, the first lean amine stream and the second lean amine stream comprise different amines, with the first lean amine stream having a higher $H_2S$ selectivity than the second lean amine stream at a low acid gas loading, and the second lean amine stream having a higher $H_2S$ selectivity than the first lean amine stream at a high acid gas loading.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. Furthermore, no limitations are intended to the details of construction or design herein shown, other than as described in the claims below. It is therefore evident that the particular illustrative embodiments disclosed above may be altered or modified and all such variations are considered within the scope and sprit of the present invention. Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Whenever a numerical range with a lower limit and an upper limit is disclosed, a number falling within the range is specifically disclosed. Moreover, the indefinite articles "a" or "an", as use in the claims, are defined herein to mean one or more than one of the element that it introduces.

What is claimed is:

1. A process for selectively separating $H_2S$ from a sour gas stream which also comprises $CO_2$, the process comprising the steps of:
    providing an absorber column and an absorbent regenerator column;
    feeding the sour gas stream into a bottom portion of the absorber column;
    feeding an absorbent comprising one or more amines into a top portion of the absorber column; and
    feeding a water stream to the absorber column at a water feed point that is above a sour gas stream feed point and below an absorbent feed point, wherein the water feed point separates the bottom portion of the absorber column from the top portion of the absorber column, and the water stream includes at least a portion of condensed water from a condenser of the absorbent regenerator column, wherein the feeding includes selectively separating $H_2S$ from the sour gas stream.

2. The process of claim 1, wherein the one or more amines is selected from the group consisting of amines, hindered amines, alkanolamines, sterically hindered alkanolamines, and mixtures thereof.

3. The process of claim 1, wherein the water stream further comprises fresh water.

4. The process of claim 1, wherein the water stream is cooled prior to feeding to the absorber column.

5. The process of claim 1, wherein the water stream creates an amine concentration gradient that provides higher selectivity for $H_2S$ by the one or more amines in the bottom portion of the absorber column relative to the top portion of the absorber column.

6. The process of claim 5, wherein the top portion of the absorber column has a more concentrated amine solution relative to the bottom portion of the absorber column because the bottom portion has a diluted amine solution resulting from the condensed water from the condenser of the absorbent regenerator column.

* * * * *